June 23, 1936.  E. L. SCHUMACHER  2,045,372
TOOL FOR ASSEMBLING OPHTHALMIC MOUNTINGS
Filed Oct. 20, 1933  2 Sheets-Sheet 1
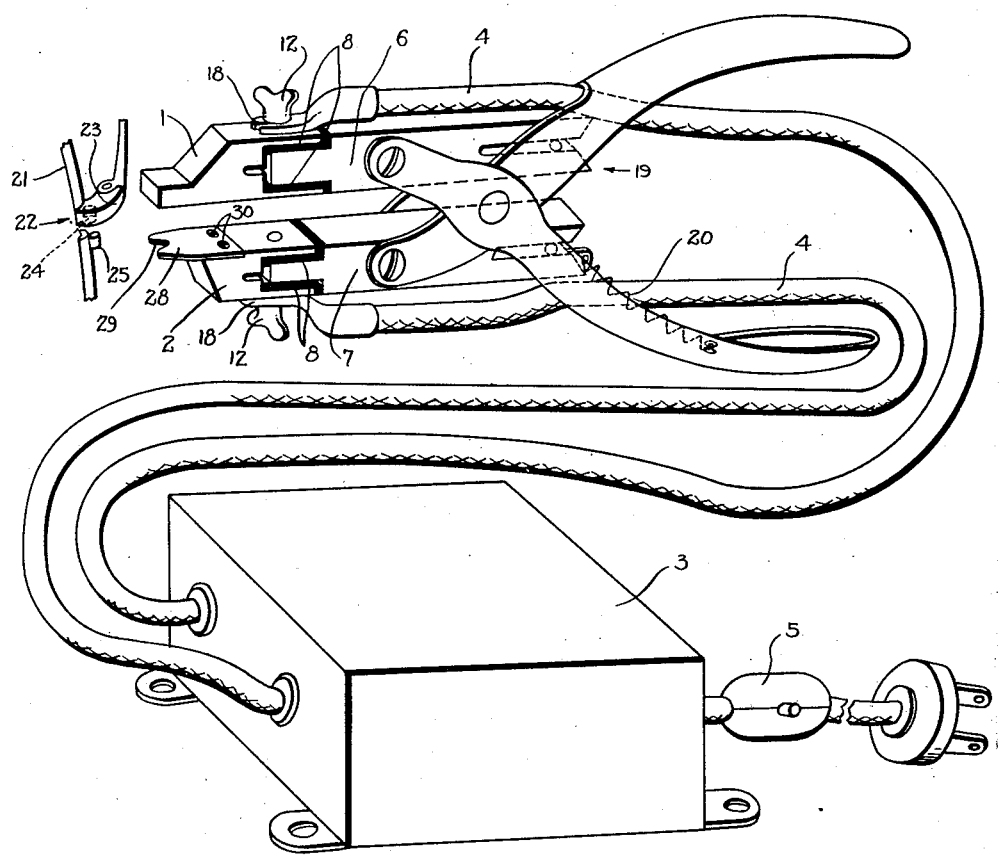
FIG. I.
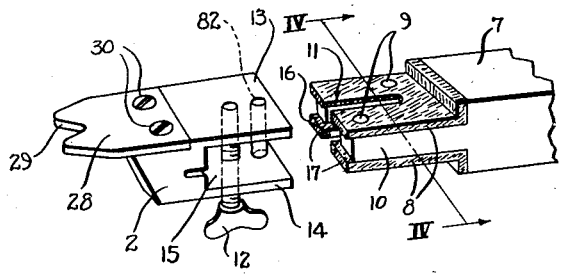
FIG. III.
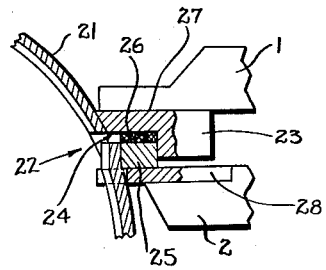
FIG. II.
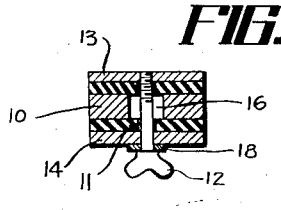
FIG. IV.
INVENTOR
Elmer L. Schumacher.
BY
Harry H. Styll
ATTORNEY June 23, 1936.  E. L. SCHUMACHER  2,045,372
TOOL FOR ASSEMBLING OPHTHALMIC MOUNTINGS
Filed Oct. 20, 1933  2 Sheets-Sheet 2
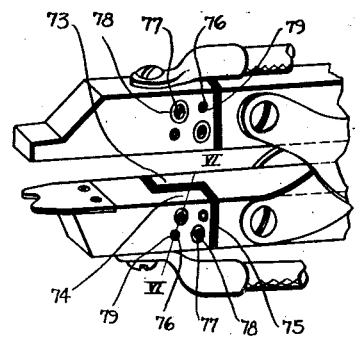
FIG.V
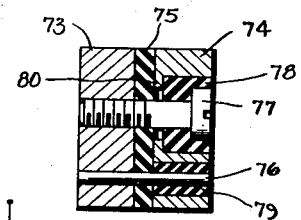
FIG.VI
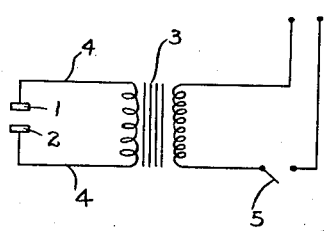
FIG.VII
INVENTOR
Elmer L. Schumacher.
BY
Harry H. Styll.
ATTORNEY

UNITED STATES PATENT OFFICE 2,045,372

TOOL FOR ASSEMBLING OPHTHALMIC MOUNTINGS

Elmer L. Schumacher, Southbridge, Mass., assignor to American Optical Company, Southbridge, Mass., a voluntary association of Massachusetts Application October 20, 1933, Serial No. 694,506

2 Claims. (Cl. 219—12)

This invention relates to improvements in means for assembling ophthalmic mountings and has particular reference to improved means and methods of integrally uniting and separating the operable and separable parts of such mountings.

One of the principal objects of the invention is to provide improved means and method of integrally assembling and separating the operable and separable parts of an ophthalmic mounting by the application of heat.

Another object of the invention is to provide hand operable means for holding the operable and separable parts in aligned relation with each other and of applying heat to said parts to cause solder means associated therewith to melt and flow between said parts and thereafter allowing the parts to cool to cause the solder means to harden and adhere to the parts and integrally unite the same.

Another object of the invention is to provide means in a device of this character for controlling the amount of heat applied to the parts being united or separated.

Another object is to provide improved means and method of supporting the parts in proper relation with each other, to permit ease in uniting or separating said parts.

Another object is to provide plier type means with which a plurality of different type jaws used for uniting and separating the different operable and separable parts of an ophthalmic mounting may be quickly and easily attached or separated from the plier means.

Another object is to provide insulated attaching zones on pliers of this character whereby interchangeable jaw members may be quickly and easily removed or attached to the pliers and be insulated from the jaw supporting portions of said pliers.

Another object is to provide simple, efficient and economical means and methods of uniting and separating the operable and separable parts of an ophthalmic mounting which may be quickly and easily adapted to the requirements of different types of connections.

Other objects and advantages of the invention will become apparent from the following description taken in connection with the accompanying drawings, and it will be apparent that many changes may be made in the details of construction, arrangement of parts and methods shown and described without departing from the spirit of the invention as expressed in the accompanying claims. I, therefore, do not wish to be limited to the exact details of construction and methods shown and described as the preferred forms only have been shown by way of illustration.

Referring to the drawings:

Fig. I is a perspective view of one of the devices embodying the invention;

Fig. II is a fragmentary side elevation of the jaw members shown in Fig. I, showing their relation with the parts of an ophthalmic mounting during the assembling operation;

Fig. III is a fragmentary perspective view of one of the jaw members separated from its supporting means and showing the details of the interchangeable connection;

Fig. IV is a sectional view taken on line IV—IV of Fig. III showing the jaw in assembled relation with its supporting means;

Fig. V is a fragmentary perspective view of another modified form of the invention;

Fig. VI is an enlarged sectional view taken on line VI—VI of Fig. V; and

Fig. VII is a schematic view of the heating element of the device embodying the invention.

It has been usual in the past, in the assembling of the operable and separable parts of an ophthalmic mounting to employ screw means for connecting said parts. This type of connecting means, although efficient from the standpoint of ease of assembling and separating, became loose during use and allowed the parts to sag and move out of aligned relation with each other. This looseness, in most instances, was due to the tendency of the screw means to back out during use or to the wearing and breaking away of the threaded portions thereof during use.

To overcome the above defects the various operable and separable connections have been changed to utilize solder connecting means which can be quickly and easily united to form a positive and more or less permanent connection when the parts are in proper relation with each other and which may be quickly and easily separated to permit the interchanging of parts if desired. Although this type of connection is very satisfactory the means employed to perform the operation of uniting or separating these connections in the past, has been exceedingly large, bulky, and limited to uniting or separating only one specific type of connection. These machines were also very costly, required special bench space, and were so constructed that they hindered vision of the work and were in general difficult and awkward to manipulate.

It, therefore, is one of the primary objects of this invention to provide simple, efficient and economical means which may be quickly and easily adjusted to the requirements of different connections, which is light and easy to handle, and with which the parts of said connections may be clearly viewed for alignment etc. prior to being united and to provide an improved process whereby the said parts may be quickly united or separated.

Referring more particularly to the drawings wherein like characters of reference designate like parts throughout the several views, the device embodied in the invention, as shown in Figures I and VII, comprises broadly a pair of clamp jaws 1 and 2 connected to a transformer 3 by the lead wires 4. The transformer 3 is provided with a socket connection by means of which the said transformer may be connected to any suitable source of electrical energy and is also provided with a current control switch 5 for regulating the amount of electricity admitted to the clamp jaws 1 and 2 during the use of the device.

The clamp jaws 1 and 2, as shown in Figures I to IV inclusive, are connected to the jaw supports 6 and 7 of a pair of hand pliers 19 and are insulated from said jaw supports by insulating pads 8 carried by the reduced ends 10 of said supports. The pads 8 are secured to the reduced ends 10 by insulated rivets or other suitable means 9 and are each provided with a slot 11 to receive the clamp screw 12 of the jaw members 1 and 2. The clamp screws 12 are threadedly attached to spaced fingers 13 and 14 formed on the jaw members and provide means for rigidly clamping the said jaw members to their supports. The said spaced fingers are adapted to form sockets to receive the reduced ends 10 and provide means whereby the jaws may be quickly removed or attached to said ends. Attention is directed to the fact that the reduced portions 10 are also slotted at 16 to receive the clamp screws 12 and that the said slots 16 are so dimensioned that when the screws 12 are positioned within the slots 11, the walls of the slots 16 will be in spaced relation with said screws so as not to form an electrical contact therewith. Attention is also directed to the fact that the pad members 8 extend outwardly at 17 beyond the ends of the reduced portions 10 and position said ends in spaced relation with the bottom of the sockets 15 so as to completely insulate the jaw members 1 and 2 from the jaw supports 6 and 7.

The lead wires 4 are provided with slotted tip members 18 which are adapted to be placed beneath the heads of the screw members 12 so that when they are tightened to secure the jaw members 1 and 2 to the jaw supports 6 and 7 they will simultaneously secure the tip members to said jaws. This provides means whereby the lead wires may be quickly and easily connected or detached from the jaw members.

The pliers 19 are of the usual prior art parallel jaw type which if desired may be provided with spring means 20 for holding the jaws in spaced relation with each other when not in use.

The jaws 1 and 2 in this instance are adapted for use in assembling the split endpiece type connections of an ophthalmic mounting having its lens rims 21 split at 22 on the temporal sides thereof to provide means whereby lenses may be inserted or removed from the rims. One of the split ends of the rim in each instance is provided with a temple support 23 having a recess 24 therein adapted to receive a lug 25 carried by the opposite split end of the rim. The socket 24 is provided with a wad or disc 26 of soft solder which, when the parts are in assembled relation with each other, as shown in Fig. II, is adapted to be melted and allowed to flow between the parts by turning on the switch 5 and allowing electrical energy to flow through the jaw members 1 and 2 and through the parts held thereby until the said parts become heated. The switch is then operated to shut off the electrical energy and the parts are allowed to cool to permit the solder to harden and adhere to said parts and integrally unite the same. Attention is directed to the fact that the parts are held during the cooling operation so that they will be in proper relation with each other when the solder means hardens and adheres thereto.

The jaw 1 in this instance is provided with a flat contact surface 27 adapted to engage the upper portion of the member 23 and the jaw 2 is provided with a plate 28 having a slot 29 in the free end thereof adapted to straddle the rim 21 to allow the said plate to engage with the lug 25 and force the same within the recess 24 to tighten the rim 21 on the lens. The jaw 1 is preferably made of bronze or other suitable conducting material which will not cause a loss of power when electrical energy flows therethrough. The major portion of the jaw 2 is also formed of a bronze or material similar to that of the jaw 1, but the plate 28 is preferably made of steel or other means for creating a resistance to assist in heating the parts of the mounting which are to be connected. The plate 28 is secured to the jaw 2 by screws or other suitable means 30.

The transformer 3 in this instance is provided with a primary connection adapted to receive 110 volts or the voltage of an ordinary power line and a secondary connection which is adapted to have an output of approximately 1 volt. Although this type of transformer has been used with success, it is apparent that any suitable type of transformer may be used and that the voltage output thereof may be varied in accordance with its requirements.

In Figures V and VI there is shown a modified form of connection for connecting the jaw members to the jaw supporting portions of the pliers. In this instance the jaw members and the jaw supporting portions of the pliers are provided with overlapping portions 73 and 74 having insulation means 75 there between. The overlapping portions 73 and 74 are connected by pin members 76 and screw members 77 which are insulated from the member 74 by tubular insulating members 78 and 79. The tubular members 78 are adapted to engage shoulders 80 formed at the bottom of the openings in the member 74. These shoulders provide means whereby the member 74 may be drawn toward the member 73 when the screw members 77 are tightened. Attention is also directed to the fact that the walls of the shoulders 80 are in spaced relation with the screws 77 so as not to have an electrical contact with said screws. The pin members 76 and tubular members 79 are pressed within the aligned openings in the members 73 and 74 and are thereby frictionally locked with said members. The pin members 76 merely perform the function of maintaining the parts in aligned relation with each other and to prevent the jaw members turning sidewise when they are forced toward each other. This type of connection of the jaw with its supporting means is more or less permanent and is only used when several separate plier members are provided, each for performing an individual operation.

In connection with the plier and jaw members such as shown in Figures I and II it is to be understood that when it is desired to separate the members 23 and 25, the said member 23 is gripped on its sides opposite those shown engaged by the jaw members in Fig. II. Heat is then applied to the connection by operating the switch member 5 whereupon the solder means will melt and allow the lug 25 to spring outwardly of the recess 24.

Although applicant has shown and described only a few different types of jaw members it is to be understood that several different types of jaw members and interchangeable connections may be provided and yet be within the scope of applicant's invention.

It is to be understood that if desired the jaw members, as shown in Figure III, may be provided with an aligning pin 82 to provide additional means whereby the said jaw members will be held against twisting sidewise during use.

It is to be understood that in all instances the operable and separable parts are gripped and held in proper aligned relation with each other previous to the heating thereof, and that the heat applied to said parts is definitely controlled by the operator so as not to overheat and cause injury to said parts during the uniting thereof. The controlling of the heat also applies to the separating of the parts.

From the foregoing description it will be seen that applicant has provided simple, efficient and economical means and methods of accomplishing all of the objects and advantages of the invention, particularly that of uniting and separating the operable and separable parts of an ophthalmic mounting by the application of heat and of providing improved means and process by which several different types of operable and separable connections may be quickly, easily and more or less permanently united or separated with ease and accuracy.

Having described my invention I claim:

1. In a device of the character described, a pair of clamp arms mounted for movement toward and away from each other and each having a shouldered portion and a reduced jaw attaching portion, a pair of work holding jaw members each having a shouldered portion and a reduced attaching portion shaped to overlie each of the reduced attaching portions of the clamp arms with the end of each overlapping portion positioned adjacent the shoulder of the other portion, one of said reduced overlapping portions having a slot therein and the other having securing means fitting in said slot for securing the overlapping portions together, and insulating means between said reduced overlapping portions and between the shouldered portions and the ends adjacent said shouldered portions to support the said portions in spaced relation with each other, said insulating means adjacent the edge of the slot forming means for holding the securing means in spaced relation with the side walls of the slot when the jaw members are in attached relation with the clamp arms.

2. In a device of the character described, a pair of clamp arms each having an attaching zone adjacent their forward ends, detachable jaw members each having an attaching zone shaped to fit the attaching zone of each clamp arm means for insulating the jaw members from the clamp arms and means for attaching the jaws to the clamp arms in said insulated relation, manually operable handle means pivotally connected with each other and with the clamp arms for movement of said arms towards and away from each other in substantially parallel relation, and electrical conducting means extending through each respective handle and connected with the jaw members.

ELMER L. SCHUMACHER.